(12) United States Patent
Dhakras et al.

(10) Patent No.: US 8,170,991 B1
(45) Date of Patent: May 1, 2012

(54) METHOD AND APPARATUS FOR MANAGING IMAGE DATA ON A SEQUENTIAL STORAGE DEVICE

(75) Inventors: Nilesh Dhakras, Pune (IN); Priyesh Narayanan, Pallikkunnu (IN)

(73) Assignee: Symantec Corporation, Mountain View, CA (US)

( * ) Notice: Subject to any disclaimer, the term of this patent is extended or adjusted under 35 U.S.C. 154(b) by 424 days.

(21) Appl. No.: 12/210,240

(22) Filed: Sep. 15, 2008

(51) Int. Cl.
*G06F 7/00* (2006.01)
*G06F 17/00* (2006.01)
*G06F 12/00* (2006.01)
*G06F 17/30* (2006.01)

(52) U.S. Cl. ................................. 707/640; 707/821
(58) Field of Classification Search ............... 707/640, 707/821
See application file for complete search history.

(56) References Cited

U.S. PATENT DOCUMENTS

| | | | |
|---|---|---|---|
| 6,253,300 B1* | 6/2001 | Lawrence et al. | 711/173 |
| 7,032,125 B2* | 4/2006 | Holt et al. | 714/6.12 |
| 2001/0034737 A1* | 10/2001 | Cane et al. | 707/204 |
| 2003/0018878 A1* | 1/2003 | Dorward et al. | 711/216 |
| 2004/0003314 A1* | 1/2004 | Witt et al. | 714/6 |
| 2005/0021501 A1* | 1/2005 | Butron | 707/2 |
| 2007/0291391 A1* | 12/2007 | Gill et al. | 360/55 |

* cited by examiner

*Primary Examiner* — Charles Lu
(74) *Attorney, Agent, or Firm* — Campbell Stephenson, LLP

(57) ABSTRACT

Method, apparatus, and computer readable medium for managing an image of a storage volume are described. File extents for each of a plurality of files as defined in an original block layout of the image are obtained. A re-ordered block layout is generated by re-ordering, for each file of the plurality of files, blocks as defined by the original block layout based on the file extents of the respective file such that the blocks are contiguous. Layout metadata indicative of a mapping between the original block layout and the re-ordered block layout is generated. An archive image having the re-ordered block layout and the layout metadata is stored to a sequential storage device.

16 Claims, 4 Drawing Sheets

METHOD AND APPARATUS FOR MANAGING IMAGE DATA ON A SEQUENTIAL STORAGE DEVICE

BACKGROUND OF THE INVENTION

1. Field of the Invention

The present invention relates generally to data backup. More particularly, the present invention relates to a method and apparatus for managing image data on a sequential storage device.

2. Description of the Related Art

Computer systems and their components are subject to various failures that may result in the loss of data. For example, a storage device used in or by the computer system may experience a failure (e.g., mechanical, electrical, magnetic, etc.) that may make any data stored on the device unreadable. To mitigate the risk of losing data, a computer system may include backup software for making backup copies of data stored on various storage devices.

Some types of backup involve two stages: First, an image of data stored on one or more target storage devices is captured and backed up to disk storage (e.g., one or more hard disk drives). Typically, the data image is an exact copy of the data as stored on the target storage device(s). Second, the data image is copied to sequential storage for archival purposes, such as tape-based storage (e.g., one or more tape drives). As is known, data in disk storage can be accessed randomly, whereas data in sequential storage is accessed serially.

For backup systems, it is desirable to: (1) achieve efficient full image recovery; and (2) achieve efficient restoration of individual files of the image data, referred to as "granular restore". In granular restore from sequential storage, a file can be restored (recovered from the backed up data image) without having to restore the entire data image on disk. In prevailing backup systems, a data image backed up to disk storage is streamed in its original format to sequential storage. As is known, however, the blocks making up a file may be physically scattered on the disk storage (referred to as "fragmentation"). Hence, if a data image is streamed in its original format to sequential storage, some or all of the files will remain fragmented in the sequential storage. In order to perform granular restoration of a particular file that is fragmented, the sequential storage must be scanned in order to locate all of the blocks of the particular file. In worst case scenario, two blocks of a file being granularly restored may be located at opposite ends of the image in the sequential storage, requiring the entire sequential storage to be scanned. Thus, granular restoration of files from a data image backed up to sequential storage may be an inefficient process.

Accordingly, there exists a need in the art for a method and apparatus for efficient management of image data on a sequential storage device.

SUMMARY OF THE INVENTION

Aspects of the invention relate to a method, apparatus, and computer readable medium for managing an image of a storage volume. File extents for each of a plurality of files as defined in an original block layout of the image are obtained. A re-ordered block layout is generated by re-ordering, for each file of the plurality of files, blocks as defined by the original block layout based on the file extents of the respective file such that the blocks of the respective file are contiguous. Layout metadata indicative of a mapping between the original block layout and the re-ordered block layout is generated. An archive image having the re-ordered block layout and the layout metadata is stored to a sequential storage device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
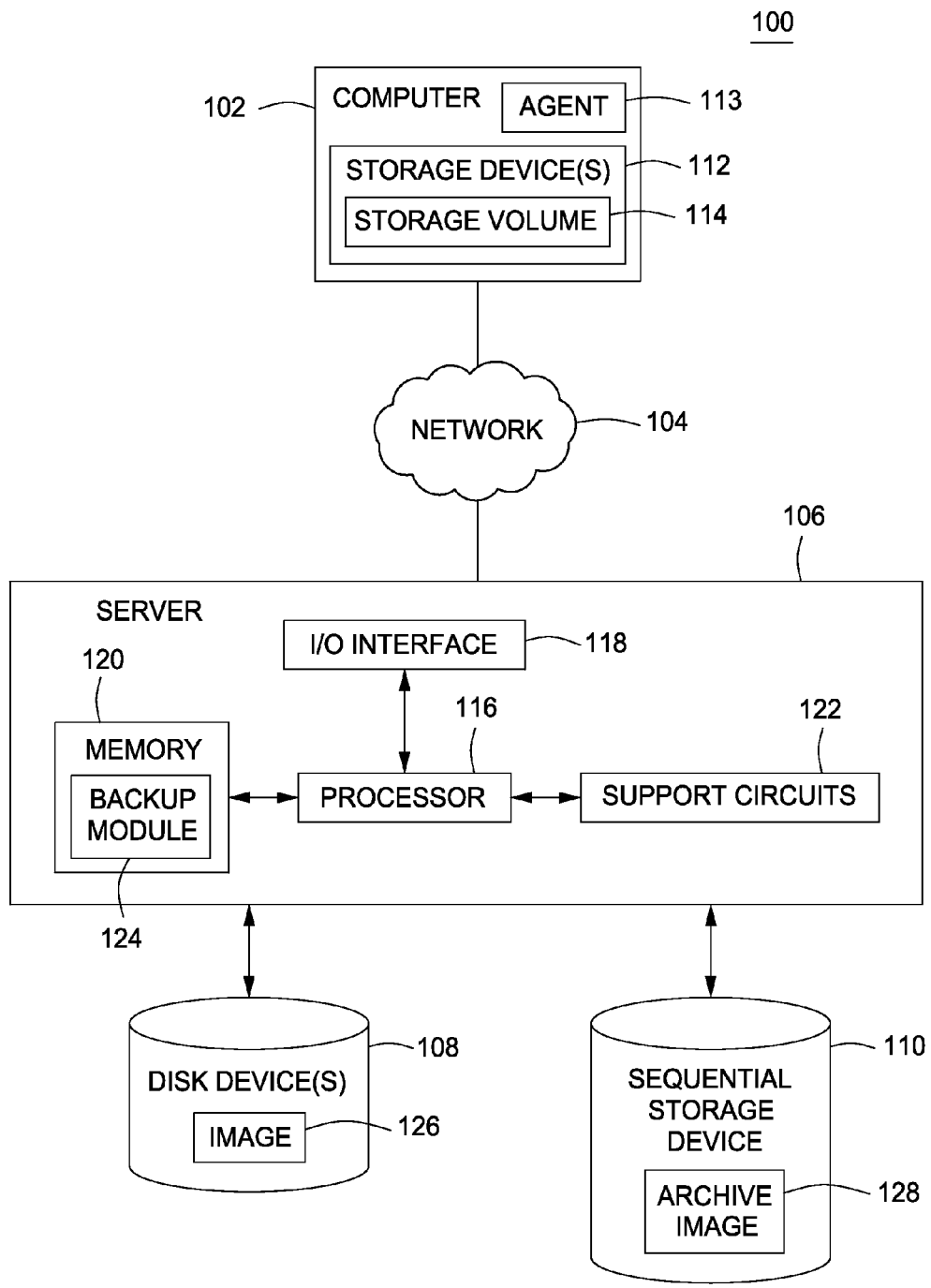
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 104, a computer 102, a server 106, one or more disk devices 108, and a sequential storage device 110. The network 104 comprises a communication system that connects computer systems by wire, cable, fiber optic, and/or wireless links facilitated by various types of well-known network elements, such as hubs, switches, routers, and the like. In particular, the network 104 connects the computer 102 and the server 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, or all or part of a local area network (LAN).

The computer 102 illustratively includes one or more storage devices 112 and agent software 113. The storage device (s) 112 implement a storage volume 114. The storage volume 114 includes any type of block-based storage areas. The storage device(s) 112 may be implemented using a disk drive system, which may include, for example, one or more hard disk drives. The storage volume 114 stores data, such as application programs, data files, and the like, which are organized into a file system. A file system refers to the structure and arrangement of files in the storage volume 114. For example, a file system can include a hierarchy of directories, each of which may contain zero or more files. The agent software 113 is configured to cooperate with the server 106 to perform a backup process for backing up the storage volume 114. For purposes of clarity by example, the computer 102 is shown as having a single storage volume. It is to be understood that the computer 102 may include multiple storage volumes, each of which may be backed up to the server 106 as described further below with respect to the storage volume 114. The computer 102 may comprise any type of computing device capable of executing the agent software 113.

The server 106 (also referred to as a backup server 106) illustratively includes a processor 116, a memory 120, various support circuits 122, an I/O interface 118. The processor 116 may include one or more microprocessors known in the art. The support circuits 122 for the processor 116 include conventional cache, power supplies, clock circuits, data registers, I/O interfaces, and the like. The I/O interface 118 may be directly coupled to the memory 120 or coupled through the processor 116. The I/O interface 118 may be configured for communication with the network 104, the disk device(s) 108, and the sequential storage device 110. The memory 120 may include one or more of the following random access memory, read only memory, magneto-resistive read/write memory, optical read/write memory, cache memory, magnetic read/write memory, and the like.

The server 106 may be configured with a backup module 124. In some embodiments, the backup module 124 may be implemented using software stored in the memory 120 and executed by the processor 116 to perform the functions described herein. In some embodiments, the backup module 124 may be implemented using hardware, such as an application specific integrated circuit (ASIC). In some embodiments, the backup module 124 may be implemented using a combination of hardware and software.

The backup module 124 is configured to cooperate with the agent software 113 on the computer 102 to backup the storage volume 114. The backup module 124 may perform one or more backup jobs over a period of time such that one or more backups of the storage volume 114 are maintained. The backup module 124 may capture one or more images of the storage volume 114. An "image" is a snapshot of the storage volume 114 at a particular time. An image may be a full image, which is a block-by-block copy of the storage volume 114. In some embodiments, the backup module 124 may perform incremental backups and, as such, an image may include just those blocks of the storage volume 114 that changed with respect to the blocks of a previous full image ("incremental image"). Further, the structure of an image may comport with any of various well known formats, such as SYMANTEC V2I, VMWARE VMDK, MICROSOFT Virtual Server VHD, and the like.

The backup module 124 stores one or more images 126 in the disk device(s) 108. The disk device(s) 108 may comprise, for example, one or more hard disk drives. For each backup job, the backup module 124 may also invoke a duplicate backup job, where an image being captured on disk is also stored in the sequential storage device 110. The sequential storage device 110 may comprise a tape drive or the like. Images stored in the sequential storage device 110 are referred to herein as "archive images" to differentiate them from the image(s) 126. Thus, the sequential storage device 110 stores one or more archive images 128. As described below, the archive image(s) 128 are configured to facilitate efficient granular restoration of individual files, as well as efficient full restoration of the storage volume 114.

Figure 2:
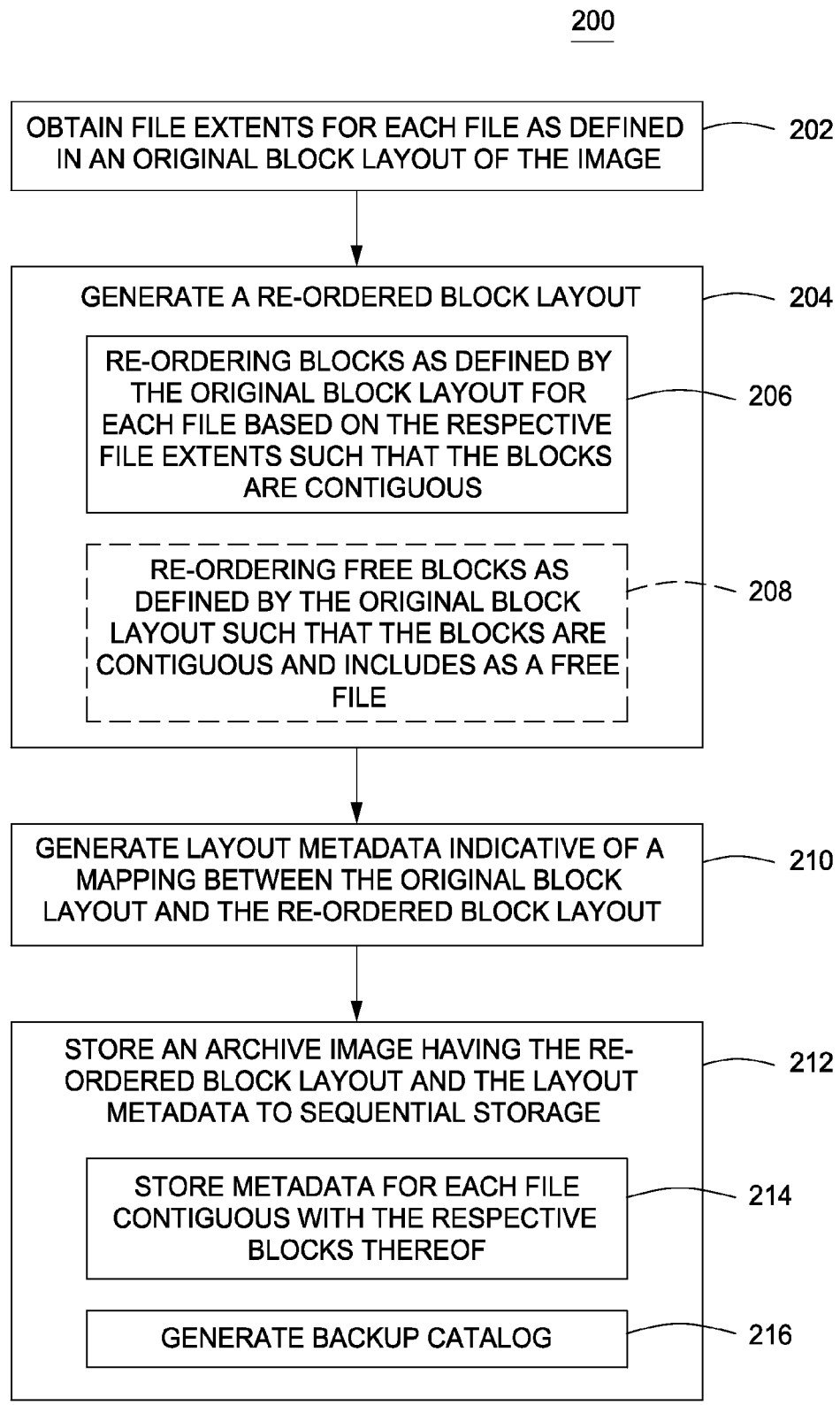
FIG. 2 is a flow diagram depicting an exemplary embodiment of a method of storing an image of a storage volume to a sequential storage device in accordance with one or more aspects of the invention.

FIG. 2 is a flow diagram depicting an exemplary embodiment of a method 200 of storing an image of a storage volume to a sequential storage device in accordance with one or more aspects of the invention. The method 200 may be performed by the backup module 124 to store an image 126 stored on the disk device(s) 108 as an archive image 128 stored on the sequential storage device 110. Accordingly, aspects of the method 200 may be understood with reference to the system 100 of FIG. 1.

The method 200 begins at step 202, where the backup module 124 obtains file extents for each file as defined in an original block layout of the image 126. Notably, the layout of the blocks of the image 126 is referred to as the "original block layout." A particular file in the image 126 may comprise one or more blocks. The blocks of a file are not necessarily contiguous within the original block layout and may be scattered or "fragmented" across the extent of the image 126. The particular blocks within the original block layout for a given file are referred to as "file extents." The file extents for a file can be used to identify which blocks of the original block layout correspond to the file. Note that a "file" as stored in the image 126 may be a copy of a full file as stored in the storage volume 114 (e.g., the image 126 is a full image). Alternatively, a "file" as stored in the image 126 may include only changed blocks of a full file as stored in the storage volume 114 (e.g., the image 126 is an incremental image).

At step 204, the backup module 124 generates a re-ordered block layout. To generate the re-ordered block layout, the backup module 124 may re-order blocks as defined by the original block layout for each file based on the respective file extents such that the blocks are contiguous (step 206). Thus, in the re-ordered block layout, the blocks comprising any given file are contiguous. Note that the re-ordered block layout is separately generated from the original image. The original image itself is not changed.

Figure 3:
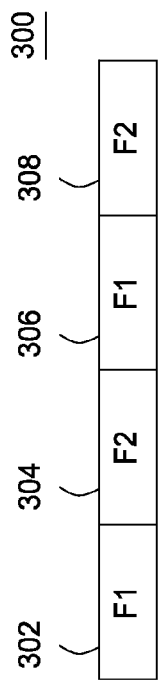
FIG. 3 is a block diagram depicting a portion of an original layout of an image having two files.

Notably, FIG. 3 is a block diagram depicting a portion 300 of an original layout of the image 126 having two files, f1 and f2. The portion 300 shows a sequence of blocks 302 through 308. The blocks 302 correspond to the file f1, the blocks 304 correspond to the file f2, the blocks 306 correspond to the file f1, and the blocks 308 correspond to the file f2. Accordingly, both the files f1 and f2 are fragmented, since the blocks 302 and 306 of the file f1 are interleaved with the blocks 304 and 308 of the file f2.

Figure 4:
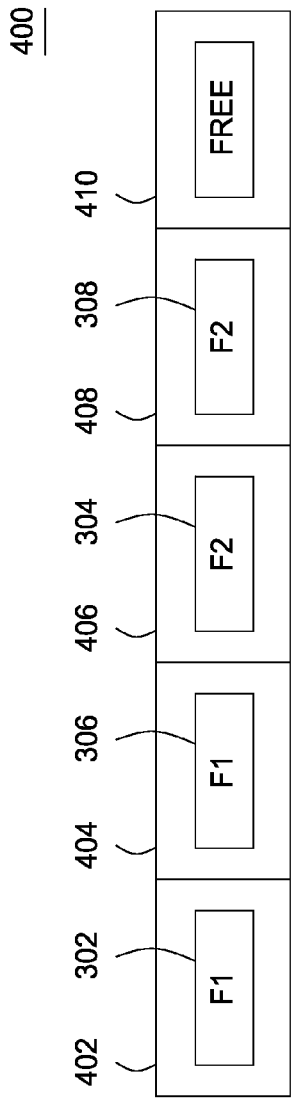
FIG. 4 is a block diagram depicting a portion of a re-ordered block layout of the original block layout of FIG. 3.

FIG. 4 is a block diagram depicting a portion 400 of a re-ordered block layout of the original block layout portion 300. The portion 400 shows a sequence of contiguous blocks 402 through 408. In the portion 400, the blocks 402 and 404 are identical to the blocks 302 and 306 of the file f1, respectively. Likewise, the blocks 406 and 408 are identical to the blocks 304 and 308 of the file f2, respectively. Thus, the blocks 302 and 306 of the file f1 are contiguous, and the blocks 304 and 308 of the file f2 are contiguous.

Returning to FIG. 2, the storage volume 114 may include free blocks that are not used to store any file. As such, the image 126 may likewise include these free blocks. Similar to fragmented files, the free blocks are scattered through the original block layout of the image 126. In some embodiments, the backup module 124 re-orders free blocks within the original block layout of the image 126 such that the free blocks are contiguous, and the backup module 124 includes the re-ordered free blocks in the re-ordered block layout as a "free file" following the files (step 208). Thus, referring to FIG. 4, blocks 410 following the blocks 408 may be contiguous free blocks represented by a free file.

At step 210, the backup module 124 generates layout metadata indicative of a mapping between the original block layout of the image 126 and the re-ordered block layout produced in step 204. For example, referring to FIGS. 3 and 4, the blocks 402, 404, 406 and 408 are mapped to the blocks 302, 306, 304, and 308, respectively. If the re-ordered block layout includes a free file, the layout metadata includes the mapping between the blocks of the free file (e.g., the blocks 410) and the free blocks in the original block layout of the image 124.

At step 212, the backup module 124 stores the archive image 128 having the re-ordered block layout and the layout metadata to the sequential storage device 110. When storing the archive image 128, the backup module 124 can store metadata for each file contiguous with the respective blocks thereof (step 214). The metadata for a file includes various file statistics, such as the length of the file, access control lists (ACLs), and the like. Such metadata may be derived from similar or the same metadata maintained in the image 126. The metadata for each file in the archive image 128 may further include a respective portion of the layout metadata that corresponds to that file, i.e., the particular mapping between the blocks of the original block layout and the blocks of the re-ordered block layout for that particular file. The backup module 124 may also generate a backup catalog (step 216). The backup catalog can identify a starting address (in terms of blocks) within the archive image 128 of the respective metadata for each of the files. The backup catalog can be maintained by the backup module 124 (e.g., within an internal database on the disk device(s) 108) and/or may be stored within the archive image 128.

Figure 5:
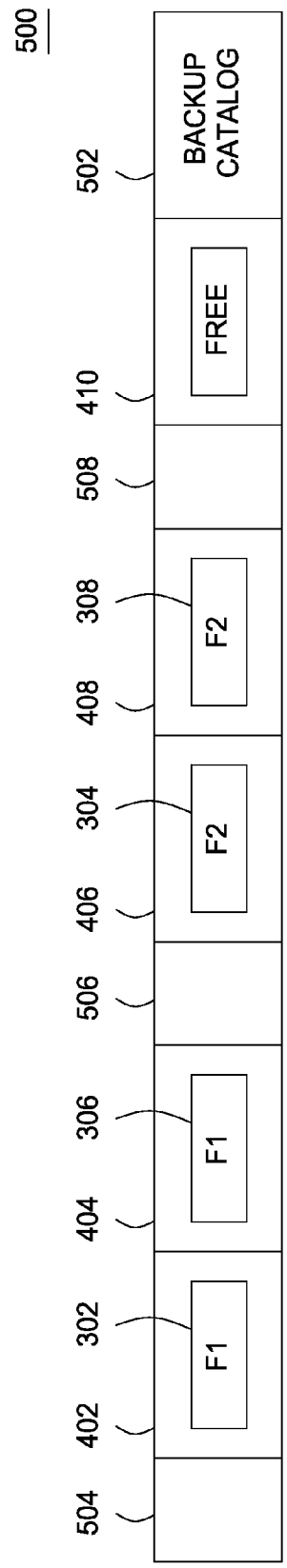
FIG. 5 is a block diagram showing an exemplary portion of a layout of an archive image in accordance with one or more aspects of the invention.

FIG. 5 is a block diagram showing an exemplary portion 500 of a layout of the archive image 128 in accordance with one or more aspects of the invention. The layout 500 includes metadata 504 for the file f1, the blocks 402 and 404 of the re-ordered layout for the file f1, metadata 506 for the file f2, the blocks 406 and 408 of the re-ordered layout for the file f2, metadata 508 for the free file, and the blocks 410 of the free file. In some embodiments, the layout 500 may include a backup catalog 502 following the blocks 410 of the free file. It is to be understood that the layouts shown in FIGS. 3-5 are exemplary and that actual layouts in practice would typically include many more than two files.

As noted above, in some embodiments, the archive image 128 may include free blocks within the original block layout of the image 126. By storing the free blocks, the "trueness" of the image 126 can be maintained. That is, a full restore from the archive image (exemplary process described below) produces the exact same block layout as the original block layout of the image 126. Various applications, such as forensic applications and the like, may have such a requirement for maintaining the "trueness" of an image being backed up.

As noted above, in some embodiments, the image 126 being backed up to the sequential storage device 110 may be an incremental image that includes only changed blocks of files with respect to a full image. Notably, blocks of a file in the image 126 that represent only changed blocks may be scattered throughout the original block layout in the same manner as blocks that represent an entire file. Thus, the method 200 described above may be used to backup both full and incremental images to the sequential storage device 110.

Figure 6:
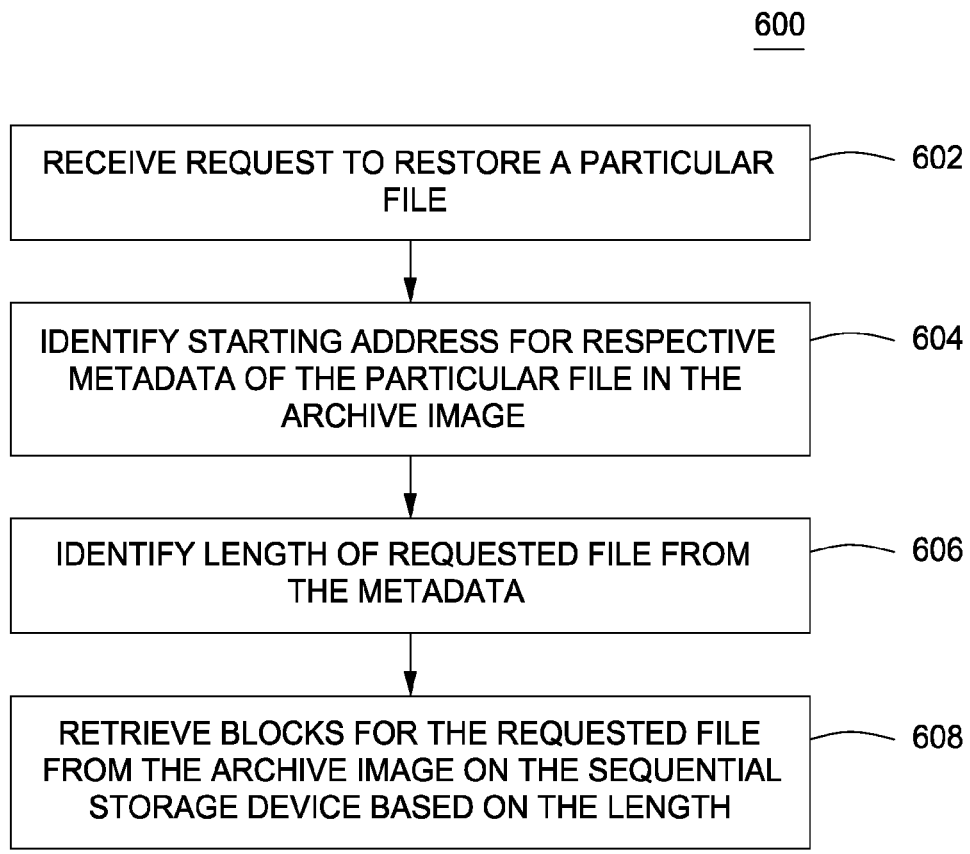
FIG. 6 is a flow diagram depicting an exemplary embodiment of a method for granular restore of a file a sequential storage device in accordance with one or more aspects of the invention.

FIG. 6 is a flow diagram depicting an exemplary embodiment of a method 600 for granular restore of a file a sequential storage device in accordance with one or more aspects of the invention. The method 600 may be performed by the backup module 124 to restore a file from the archive image 128 stored on the sequential storage device 110. The archive image 128 is stored as described above with respect to the method 200 of FIG. 2.

The method 600 begins at step 602, where the backup module 124 receives a request to restore a particular file. For example, the request may originate from the agent software 113 executing on the computer 102. At step 604, the backup module 124 identifies a respective starting address of the respective metadata for the requested file. The backup module 124 may use the backup catalog generated for the archive image 128 to locate the starting address. For example, the backup module 124 may first attempt to use a local backup catalog for the archive image 128 and, if not available, attempt to use a backup catalog stored in the archive image 128. At step 606, a length of the requested file is identified from the respective metadata thereof. That is, the backup module 124 scans the sequential storage device 110 to the beginning of the metadata based on the starting address and reads the length of the requested file from the metadata. At step 608, the backup module 124 retrieves the blocks of the requested file from the sequential storage device 110 based on the length. Notably, since the blocks of the requested file are stored contiguously in the archive image 128, the backup module 124 does not have to read or scan through blocks of non-requested files to obtain the requested file. As such, a more efficient granular restore process is provided than if the blocks of the requested file were fragmented within the archive image 128. The backup module 124 can use the retrieved blocks to restore the requested file to the computer 102.

Notably, in some embodiments, the archive image 128 was created from an incremental image and thus the blocks retrieved for the requested file may represent only the changed blocks thereof. In some cases, the method 600 may be repeated to retrieve blocks of the requested file from one or more additional archive images until all the blocks of the requested file are retrieved (i.e., blocks for a full file). That is, blocks from one or more incremental images can be combined with blocks from a full image to synthesize the requested file. While multiple archive images 128 need to be scanned to obtain the full file, each iteration of the method 600 is efficient since the respective blocks for the requested file are contiguous in each of the archive images 128.

In other cases, files in an incremental image may actually represent full files. Notably, may file formats, such as MICROSOFT OFFICE file formats, read a file completely from the storage volume 114 and write the file in full back to the storage volume 114. Thus, if such a file is modified on the storage volume 114, all of the blocks of such file end up being changed blocks that are captured by an incremental backup process. Thus, although the archive image 128 may have been created from an incremental image, the blocks retrieved for the requested file may represent all blocks of the file and no further iterations of the method 600 would need to be performed.

Figure 7:
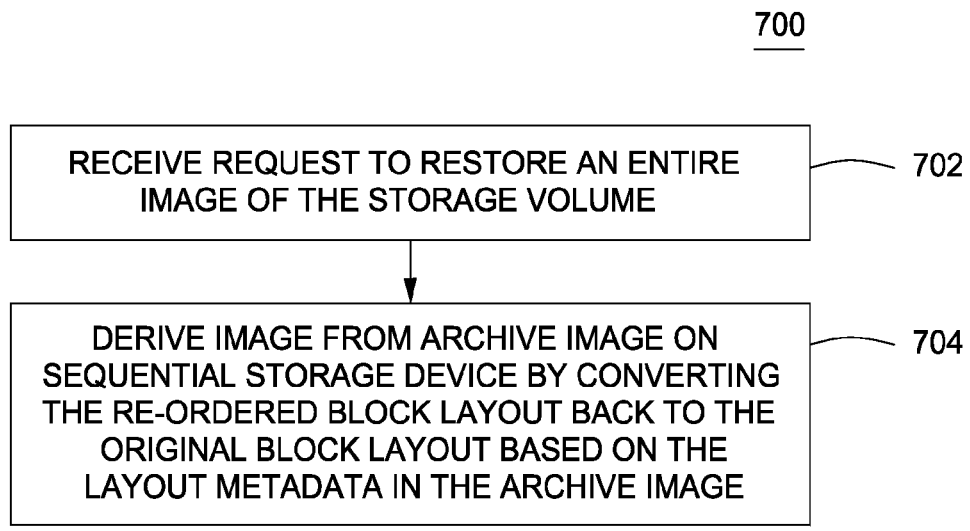
FIG. 7 is a flow diagram depicting an exemplary embodiment of a method for full restore of a storage volume from a sequential storage device in accordance with one or more aspects of the invention.

FIG. 7 is a flow diagram depicting an exemplary embodiment of a method 700 for full restore of a storage volume from a sequential storage device in accordance with one or more aspects of the invention. The method 600 may be performed by the backup module 124 to restore the storage volume 114 from the archive image 128 stored on the sequential storage device 110. The archive image 128 is stored as described above with respect to the method 200 of FIG. 2.

The method 700 begins at step 702, where the backup module 124 receives a request to restore the storage volume 114. For example, the request may originate from the agent software 113 executing on the computer 102. At step 704, an image of the storage volume 114 is derived from the archive image 128 by converting the re-ordered block layout back to an original block layout based on the layout metadata in the archive image 128. The image can be directly restored to the storage volume 114, or may be first restored to the storage device(s) 108 and then to the storage volume 114. In either case, a full restore of the storage volume 114 can be achieved with its original block layout.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
obtaining file extents for a plurality of files, wherein
the file extents are defined in an original block layout of an image of a storage volume;
generating a re-ordered block layout, wherein
for each file of the plurality of files,
the generating the re-ordered block layout comprises re-ordering respective blocks of the each file,
the respective blocks of the each file are defined by the original block layout,
the re-ordering is based at least in part on respective file extents of the each file, and
the respective blocks of the each file are contiguous in the re-ordered block layout;
generating, for each file of the plurality of files, layout metadata indicative of a mapping between
the original block layout for the each file, and
the re-ordered block layout for the each file;
storing an archive image to a sequential storage device, wherein
the archive image comprises
the re-ordered block layout, and
the layout metadata;
storing, within the archive image, metadata for the plurality of files, wherein
for each file of the plurality of files,
corresponding layout metadata for the each file is stored contiguously with corresponding blocks of the each file;
copying free blocks from the image of the storage volume into the archive image, wherein
the free blocks are stored in a contiguous arrangement in the archive image; and
restoring the image to another storage device from the archive image on the sequential storage device, wherein
the restoring comprises
converting the re-ordered block layout back to the original block layout based on the layout metadata in the archive image.

2. The method of claim 1, comprising:
storing, within the archive image, layout metadata for the free blocks, wherein
the layout metadata for the free blocks is stored contiguously with the contiguous arrangement of free blocks.

3. The method of claim 1, wherein a respective portion of the layout metadata corresponding with each file of the plurality of files is stored with the metadata of the respective file.

4. The method of claim 1, wherein the step of storing the archive image comprises:
generating a backup catalog identifying a starting address of the respective metadata for each of the plurality of files.

5. The method of claim 4, comprising:
identifying the respective starting address of the respective metadata for a file to be restored from the archive image on the sequential storage device;
identifying a length of the file to be restored from the metadata of the file to be restored; and
retrieving the respective blocks of the file to be restored based on the respective starting address and the length of the file to be restored.

6. The method of claim 1, wherein the step of generating the re-ordered block layout comprises:
re-ordering free blocks as defined by the original block layout; and
including the free blocks as re-ordered in the re-ordered layout as a free file following the plurality of files.

7. The method of claim 1, wherein at least a portion of the plurality of the files comprise incremental changes for respective full files on the storage volume.

8. An apparatus comprising:
means for obtaining file extents for a plurality of files, wherein
the file extents are defined in an original block layout of an image of a storage volume;
means for generating a re-ordered block layout, wherein
for each file of the plurality of files,
the means for generating the re-ordered block layout comprises
means for re-ordering respective blocks of the each file,
the respective blocks of the each file are defined by the original block layout,
the re-ordering is based at least in part on respective file extents of the each file, and
the respective blocks of the each file are contiguous in the re-ordered block layout;
a processor configured to generate, for each file of the plurality of files, layout metadata indicative of a mapping between
the original block layout for the each file, and
the re-ordered block layout for the each file;
means for storing an archive image to a sequential storage device, wherein
the archive image comprises
the re-ordered block layout, and
the layout metadata;
means for storing, within the archive image, metadata for the plurality of files, wherein
for each file of the plurality of files,
corresponding layout metadata for the each file is stored contiguously with corresponding blocks of the each file;
means for copying free blocks from the image of the storage volume into the archive image, wherein
the free blocks are stored in a contiguous arrangement in the archive image; and means for restoring the image to another storage device from the archive image on the sequential storage device, wherein the
means for restoring comprises
means for converting the re-ordered block layout back to the original block layout based on the layout metadata in the archive image.

9. The apparatus of claim 8, wherein a respective portion of the layout metadata corresponding with each file of the plurality of files is stored with the metadata of the respective file.

10. The apparatus of claim 8, wherein the means for storing the archive image comprises:
means for generating a backup catalog identifying a starting address of the respective metadata for each of the plurality of files.

11. The apparatus of claim 10, comprising:
means for identifying the respective starting address of the respective metadata for a file to be restored from the archive image on the sequential storage device;
means for identifying a length of the file to be restored from the metadata of the file to be restored; and
means for retrieving the respective blocks of the file to be restored based on the respective starting address and the length of the file to be restored.

12. The apparatus of claim 8, wherein the means for generating the re-ordered block layout comprises:
means for re-ordering free blocks as defined by original block layout; and
means for including the free blocks as re-ordered in the re-ordered layout as a free file following the plurality of files.

13. A computer readable storage medium having instructions stored thereon that when executed by a processor cause the processor to perform a method comprising:
obtaining file extents for a plurality of files, wherein
the file extents are defined in an original block layout of an image of a storage volume;
generating a re-ordered block layout, wherein
for each file of the plurality of files,
the generating the re-ordered block layout comprises re-ordering respective blocks of the each file,
the respective blocks of the each file are defined by the original block layout,
the re-ordering is based at least in part on respective file extents of the each file, and
the respective blocks of the each file are contiguous in the re-ordered block layout;
generating, for each file of the plurality of files, layout metadata indicative of a mapping between
the original block layout for the each file, and
the re-ordered block layout for the each file;
storing an archive image to a sequential storage device, wherein
the archive image comprises
the re-ordered block layout, and
the layout metadata;
storing, within the archive image, metadata for the plurality of files, wherein
for each file of the plurality of files,
corresponding layout metadata for the each file is stored contiguously with corresponding blocks of the each file;
copying free blocks from the image of the storage volume into the archive image, wherein
the free blocks are stored in a contiguous arrangement in the archive image; and
restoring the image to another storage device from the archive image on the sequential storage device, wherein the restoring comprises
converting the re-ordered block layout back to the original block layout based on the layout metadata in the archive image.

14. The computer readable storage medium of claim 13, wherein the step of storing the archive image comprises:
generating a backup catalog identifying a starting address of the respective metadata for each of the plurality of files.

15. The computer readable storage medium of claim 14, wherein the method comprises:
identifying the respective starting address of the respective metadata for a file to be restored from the archive image on the sequential storage device;
identifying a length of the file to be restored from the metadata of the file to be restored; and
retrieving the respective blocks of the file to be restored based on the respective starting address the length of the file to be restored.

16. The computer readable storage medium of claim 13, wherein the step of generating the re-ordered block layout comprises:
re-ordering free blocks as defined by the original block layout; and
including the free blocks as re-ordered in the re-ordered layout as a free file following the plurality of files.

* * * * *